Dec. 9, 1969 J. I. MERANDA 3,483,474
DIGITALIZED RECEIVER SYSTEM
Filed Sept. 19, 1966 2 Sheets-Sheet 1

INVENTOR
JAMES I. MERANDA
BY
ATTORNEY
AGENT

United States Patent Office 3,483,474
Patented Dec. 9, 1969

3,483,474
DIGITALIZED RECEIVER SYSTEM
James I. Meranda, Los Angeles, Calif., assignor, by mesne assignments, to the United States of America as represented by the Secretary of the Navy
Filed Sept. 19, 1966, Ser. No. 580,550
Int. Cl. H03k 5/20
U.S. Cl. 328—119      5 Claims

ABSTRACT OF THE DISCLOSURE

A digitalized system for rapidly searching for received signals which are phase coded in a known manner. The received phase coded signals are simultaneously phase compared with a plurality of locally generated phase coded signals. If the two match exactly an indicating signal is given. If they do not match, the locally generated signals are time displaced by a predetermined increment and another comparison is made.

---

Figure 1A:
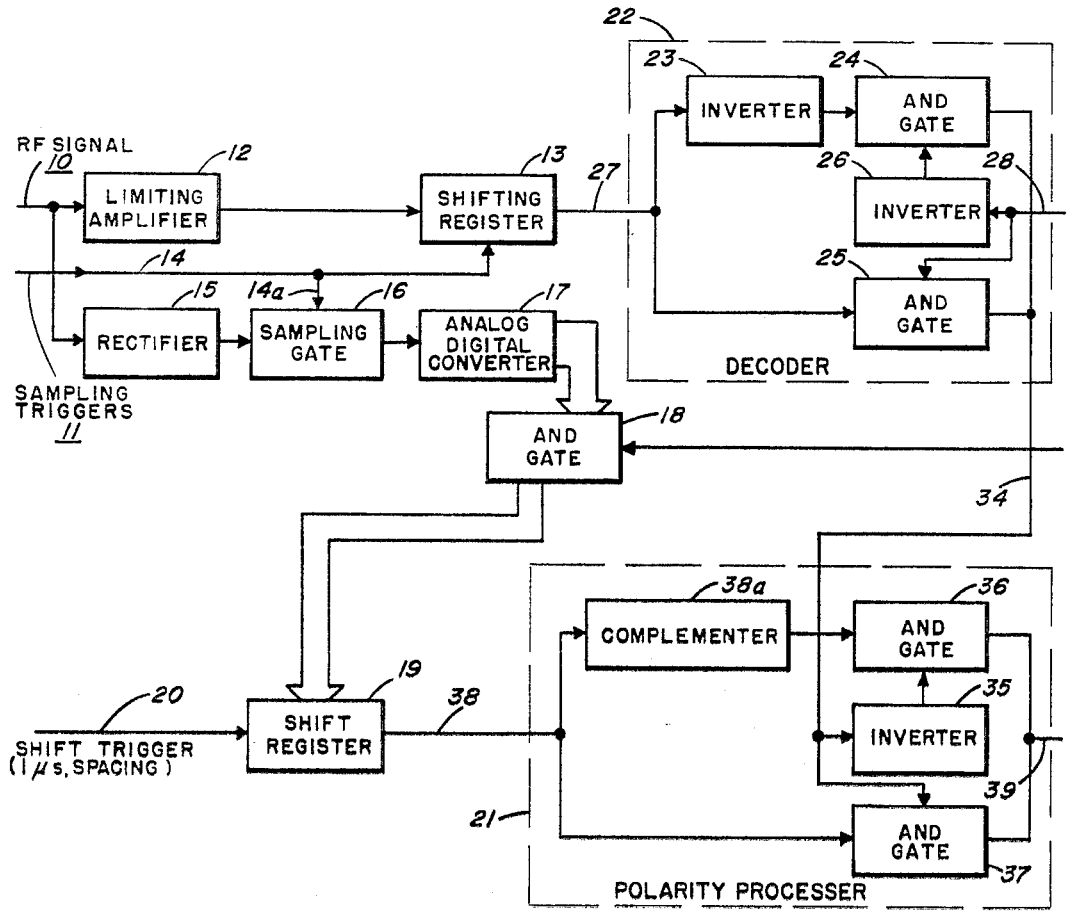

The present invention relates to a digitalized receiver system and more particularly to a digitalized system for rapidly searching for received signals which are phase coded in a known manner. The system is especially adapted to receiver phase alignment systems utilizing multiple pulse and phase code modulation of received carrier signals.

The theory of multiple pulsing and phase coding is frequently applied to various electronic navigation systems, wherein an interrogating pulse is sent out by a ship or airplane which is seeking a navigation check. The interrogating pulse is received by a land based navigating station, the pulse is verified as to frequency and phase, and the land station replies with pulses identifying the location of the station. By accepting the location of more than one of these land stations, the ship or airplane can, by triangulation, accurately determine its own navigational position.

When the theory of multiple pulsing and phase coding is applied to a navigational system such as the one pointed out above, the proper reception of the received signal by the land station requires that multiple pulse and phase coded, locally generated, signals having the same modulations as the received signals, be phase-synchronized as well as time-synchronized to the received signals in the receiver. The processes of phase-synchronization and time-synchronization are known as "searching." The present invention is primarily concerned with the phase-synchronization process.

The "searching" mode requires a length of time for its completion depending upon the length of time over which the phase coding is cyclically repetitive and the amount of noise or other interfering signals that might be present with the phase coded signals. Generally speaking, the locally generated signals are not initially in proper phase alignment with the received signals. Therefore, in the worst case of initial misalignment, the receiver must search through substantially all of the phase code misalignment possibilities before the local signals can be brought into proper phase alignment with the received signals.

The invention accomplishes the phase alignment or searching process whereby the locally generated phase coded signals are brought into proper phase alignment with the received coded signals by essentially simultaneously phase comparing the received signals with a plurality of locally generated phase coded signals, each of the plurality of local signals being identical to each other except for a predetermined time delay. If, after a proper time lapse, alignment between the desired received signals and the local signals has not been achieved, then the locally generated signals are time displaced by a predetermined increment and the search is repeated.

An object of the invention is the provision of a digitalized receiver system.

Another object is the provision of a digitalized receiver system for rapidly searching for received signals which are phase coded in a known manner.

Still another object is the provision of a receiver system which minimizes the length of time required for the phase alignment or searching process.

Yet another object is the provision of a receiver system which compares received phase coded signals with locally generated phase coded signals.

Another object is the provision of a receiver system wherein the phase coded signals are binary in nature.

Still another object is the provision of a receiver system wherein phase coded signals are compared and if there is misalignment, the local signal is shifted a small increment and the search process is repeated.

Figure 1B:
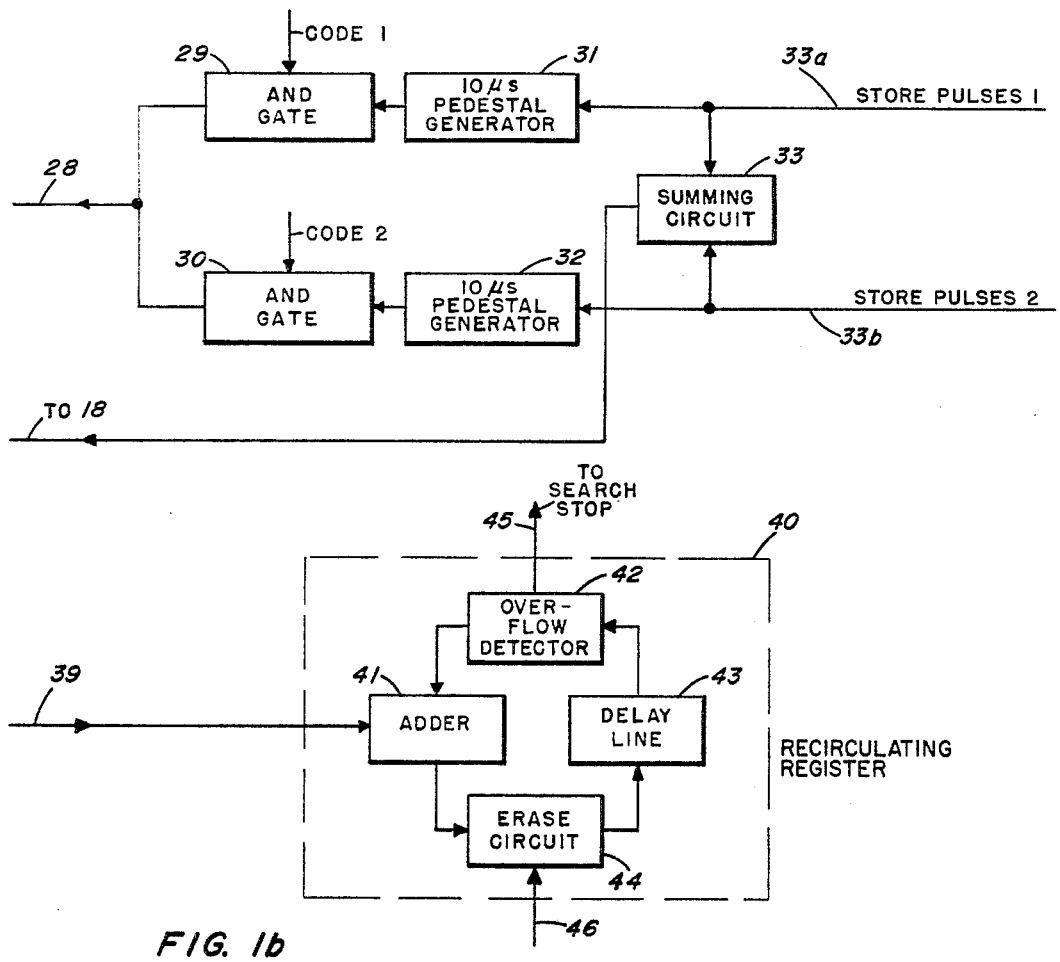
Figure 2:
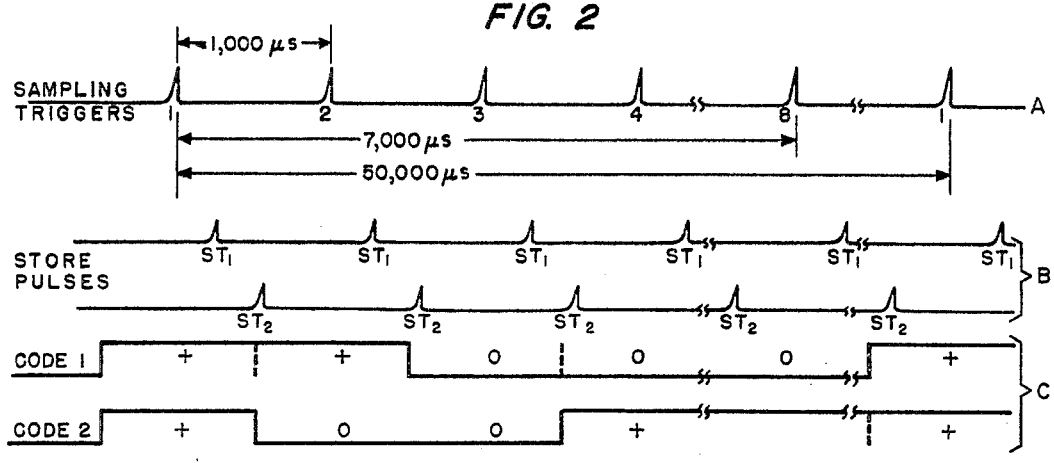

Other objects, advantages and novel features of the invention will become apparent from the following detailed description of the invention when considered in conjunction with the accompanying drawings wherein:

FIG. 1 shows a block diagram of the invention; and
FIG. 2 shows the waveforms produced by components of the invention.

Referring now to FIG. 1 there is shown an input lead 10 which is used to apply to the receiver the multiple pulse and phase coded RF signals as sent out by an interrogating ship or plane, for example. In a typical instance these RF pulses are 100 microseconds long, in groups of 8 pulses each, the groups being spaced apart by 50,000 microseconds. From input lead 10 the RF signal pulses pass through a limiting amplifier 12 and are applied to a single stage shifting register 13. A succession of locally generated sampling triggers 11 (shown as waveform A of FIG. 2) are applied via line 14 to shifting register 13 to shift in those amplified and limited RF signal cycles which occur simultaneously with the 1000 microsecond-spaced sampling triggers. In a typical instance, the period of the RF signal is 10 microseconds.

The RF pulses on lead 10 are also applied through a rectifier 15 to a sampling gate 16, gate 16 also being triggered by the sampling triggers on lead 14 via lead 14A to take an amplitude sample of the same amplified and limited RF cycles which are simultaneously shifted into register 13. The amplitude sample at the output of gate 16 is converted to an equivalent digital word representation by an analog converter 17, the individual digits in the resulting digital word being transferred, in parallel, through and AND gate 18 into a shift register 19. In a typical case, the digital word applied through gate 18 comprises 5 digits, the five digit words inserted in register 19 being shifted out by the triggers on line 20 which recur with 1 microsecond spacing. Thus, each digital word is shifted out of register 19 in a total of 5 microseconds and into a polarity processing network 21, as will be described hereinafter.

The pulses shifted out of register 13 are applied to a decoding network, shown generally as 22. The network 22 comprises an inverter 23, a pair of AND gates 24 and 25, as well as an inverter 26. The input pulses to network 22, as applied over line 27, are of either polarity, inverted or not, depending upon whether AND gate 24 or AND gate 25 is rendered conductive by the control pulses applied to them via lead 28. The control pulses on lead 28 are derived with the aid of AND gates 29 and 30, ten microsecond pedestal generators 31 and 32, and a summing circuit 33 which receives the store pulses 1 and store pulses 2 over leads 33A and 33B, respectively. Store pulses 1 and 2 are shown as $ST_1$ and $ST_2$, respectively, of waveform B, FIG. 2.

Decoded pulses from AND gate 25 are fed over lead 34 to an inverter 35 and an AND gate 37, the output of inverter 35 in turn being applied to AND gate 36, these components forming parts of a polarity processing network shown as 21. The network 21 also receives digital words over lead 38 as the output of shift register 19, these digital words being simultaneously applied to AND gate 37 and to a complementer 38A whose output is connected as a second input to AND gate 36.

The outputs of AND gates 36 and 37 are applied over lead 39 to a binary recirculating register 40, the signals on lead 39 being in uncomplemented or complemented form depending upon the binary value of the signals on lead 34, and consequently whether AND gate 36 or AND gate 37 is conducting. Every second one of the successive signals on lead 34 will be of the same binary type (either all binary "ones" or all binary "zeros") in the event that the received phase coded signals are in phase alignment either with Code I or Code II. In that case, each of the digital words occurring on lead 38 corresponding thereto will be transmitted to output lead 39 in uncomplemented form or else each of said words will be transmitted to output lead 39 in complemented form.

The binary recirculating register 40 comprises an adder 41, an overflow detector 42, a delay line 43 and an erase circuit 44. Overflow detector 42 has an output lead 45 which is energized under conditions to be described hereinafter to stop the search function, thereby indicating that proper phase alignment has been achieved between received phase coded signals and the locally generated phase coded signals. Input lead 46, to erase circuit 44 is used to reset recirculating resister 40 to initiate a new search cycle in the event that no overflow is sensed by detector 42.

Turning now to the theory and operation of the present invention, it should be noted that the phase code utilized by the device is binary in nature. That is the phase coding is accomplished by phase reversals in the RF carrier of the coded signals. A typical succession of phase coded signals is represented by the pattern ++--+-+-+---+++++, wherein each + represents a pulse having no phase reversal of the carrier, and each - represents a pulse having a phase reversal of the carrier relative to a continuous reference signal. In accordance with the invention, the received phase coded signals are simultaneously phase compared in separate receiver channels against Code I (++--+-+- +---+++++ etc.) and against Code II (+---+++++ ++--+-+- etc.), respectively.

The phase comparison is accomplished by a binary inverting switch by means of which the received phase coded signals are decoded. The switch is operated on an interleaved basis for one-half the time in accordance with Code I and for the other half of the time in accordance with Code II. The switch produces a series of pulses of the same binary value in receiver channel #1 in the event that the received pulses are in phase alignment with Code I. Similarly, the switch produces output pulses of the same binary value in receiver channel #2 if the received pulses are in phase alignment with Code II. The binary states of the output pulses from the switch determines the sense in which the successive received pulses are intergrated and stored.

In the event that the received phase coded signals are phase aligned with Code I, a succession of digital words representing the amplitude of the received signals are accumulated in a first binary counter causing it to overflow. In the event that the received phase coded signals are phase aligned with Code II, then, similarly, a second binary counter will overflow. The occurrence of overflow from either accumulator signifies that praper phase alignment has been achieved between the received and locally generated signals. The identity of the accumulator producing the overflow establishes whether the received signals are phase aligned with Code I or Code II.

In the event that neither accumulator overflows within a predetermined length of time, it is concluded that the proper alignment between signals has not been achieved, whereupon the locally generated signals are time displaced by a predetermined increment in order to continue the search at a new time relative to the received signals. If signals other than those coded in accordance with the predetermined phase code are received, neither accumulator will overflow within the integration interval because the resulting contributions to the accumulators will be randomly positive and negative tending to average towards zero.

It will be noted from waveforms A and B, FIG. 2, that the store #1 ($ST_1$) and store #2 ($ST_2$) pulses occur in pairs between each of the successive sampling triggers. The store #1 pulses are applied to pedestal generator 31, via lead 33A, wherein the duration is broadened to 10 microseconds and then applied to AND gate 29 along with the Code I signal of waveform C, FIG. 2. A 10 microsecond sample of each bit of Code I appears at the output of AND gate 29 and is applied through lead 28 and decoder 22 and lead 34 to polarity processing network 21. Similarly, a 10 microsecond sample of each bit of Code II appears at the output of AND gate 30 and is applied via lead 28 to decoder 22 and lead 34 to processing network 21.

In operation, one bit of the binary word in register 13 is applied via lead 27 to decoder 22 in response to a respective sampling trigger 11 (waveform A). Each bit is phase compared against Code I, the locally generated signal (during the time of $ST_1$), and against Code II (during the time of $ST_2$) in AND gates 24 and 25, respectively. If the bit shifted out of register 13 is the same as the corresponding bit of Code I, then AND gate 25 conducts to pass said bit along output lead 34. If the bit shifted out of register 13 is of a binary value opposite to the binary value of the corresponding bit of Code I, then AND gate 24 conducts to pass the inverted (23) bit along output lead 34. Decoder 22 operates in a similar fashion during the interval of Code II pulses on lead 28.

The decoded pulses on lead 34 are applied to AND gates 36 and 37 of polarity processing network 21 which also receives the digital words on lead 38 at the output of register 19. The digital words are then translated by network 21 to output lead 39 in uncomplemented or complemented form depending upon the binary value of the signals on lead 34.

The processed words on lead 39 are applied to the binary recirculating register 40 comprising a two section adder 41, an overflow detector 42, a delay line 43, and an erase circuit 44. The $ST_1$ pulses of waveform B of FIG. 2 occur during the time that one of the memory locations of the recirculating register 40 are available at adder 41 whereas the $ST_2$ pulses occur during the time that another of the memory locations are available at adder 41. All of the processed words resulting from the phase comparison of the received phase coded signals and the Code I signals are stored in memory location #1 whereas all of the digital words resulting from a phase comparison of the received signals and the Code II signals are stored in memory location #2. If proper phase alignment is achieved between the received signals and Code I signals, memory location #1 will overflow, i.e., the total sum of the digital words successively applied via lead 39 to adder 41 will exceed the numerical capacity of the memory #1 section of the adder. The overflow may be either in a positive or in a negative sense depending upon whether the sampling triggers 11 of waveform A of FIG. 2 and on lead 14 of FIG. 1 are in synchronism at register 13 with the positive or the negative RF cycles of the amplified and limited wave of amplifier 12. If proper phase alignment is achieved between the received signals and Code II signals, memory location #2 in the adder will overflow. Again the overflow may be either in a positive or in a negative sense.

The occurrence of either sense of overflow from either one of the two memory locations #1 and #2 of adder 41 is sensed by the overflow detector 42 of recirculating register 40 to produce a signal on output lead 45, signifying that proper phase alignment has been achieved between the received phase coded signals and the locally generated phase coded signals, whereupon the search process is terminated. In the event that no overflow is sensed by detector 42 after a predetermined whole number of phase coding intervals has transpired (for example, after four phase coding intervals has transpired), a signal is applied via input lead 46 to erase circuit 44 to reset to zero memory locations #1 and #2 of the recirculating register 40 and simultaneously to jump the timing of the sampling triggers 11 through a small increment (for example 100 microseconds). The erase of the memory locations and the jump of the sampling triggers initiates a new cycle of the search operation at new points within the repetitive interval of the received signals.

From the above description of the structure and operation of the present invention it is obvious that there is presented herein an efficient and novel means for rapidly searching received signals which are phase coded in a known manner. The received phase coded signals are rapidly compared with locally generated phase coded signals and an indication is given when phase alignment between the two has been achieved. If phase alignment is not accomplished within a predetermined lapse of time, then the locally generated signals are time-shifted by a small increment, and the search process is repeated.

Obviously many modifications and variations of the present invention are possible in light of the above teachings. It is therefore to be understood that within the scope of the appended claims, the invention may be practiced otherwise than as specifically described.

What is claimed is:
1. A digitalized receiver system comprising
means for receiving phase coded signals to be searched;
means for accepting a plurality of locally generated phase coded signals, the received phase coded signals to be compared with the locally generated signals;
a decoding network to receive both the received phase coded signals and the locally generated signals, the decoder having a plurality of AND gates for receiving the phase coded signals and the locally generated signals, as well as inverter means connected to each of the AND gates for producing a series of pulses of the same binary value if the phased coded signals are in phase alignment with the locally generated signals;
a polarity processing network connected to the output of the decoding network for translating the output of the decoding network into uncomplemented or complemented form; and
a recirculating register connected to the output of the polarity processing network to count the pulses passed by the polarity processing network.

2. The system of claim 1 further including
means for sampling a portion of said received phase coded signals in response to sampling trigger signals;
rectifier means for producing an amplitude sample of the portion of the received signals;
analog-to-digital converter means for converting the amplitude sample to an equivalent digital word representation; and
means for connecting the digital words to the polarity processing network.

3. The system of claim 2 wherein the polarity processing network comprises
a plurality of AND gates;
means connecting the binary pulses forming the output of the decoding network to the plurality of AND gates;
means for connecting the digital words representing the amplitude of the received phase coded signals and forming the output of the analog-to-digital converter to the plurality of AND gates; and
means for connecting the output of the AND gates to the recirculating register.

4. The system of claim 3 wherein the recirculating register comprises
an adder;
an overflow detector connected to the adder;
an erase circuit also connected to the adder; and
an output connected to the overflow detector, said output being energized when the overflow detector senses an overflow condition in the adder.

5. The system of claim 4 wherein said erase circuit has means to receive a control signal whereby said erase circuit resets the adder back to zero.

References Cited

UNITED STATES PATENTS

| | | | |
|---|---|---|---|
| 3,154,741 | 10/1964 | Attwood | 328—134 X |
| 3,213,370 | 10/1965 | Featherston | 325—321 X |
| 3,297,947 | 1/1967 | Riordan et al. | 328—133 X |
| 3,358,240 | 12/1967 | McKay | 328—155 X |

DONALD D. FORRER, Primary Examiner

R. L. WOODBRIDGE, Assistant Examiner

U.S. Cl. X.R.

307—232, 233; 325—321; 328—109, 134, 155; 329—104